April 25, 1939.   F. C. FROLANDER ET AL   2,155,588
TYPOGRAPHICAL COMPOSING AND DISTRIBUTING MACHINE
Filed April 28, 1937   7 Sheets-Sheet 1

April 25, 1939.  F. C. FROLANDER ET AL  2,155,588
TYPOGRAPHICAL COMPOSING AND DISTRIBUTING MACHINE
Filed April 28, 1937  7 Sheets-Sheet 4

April 25, 1939. F. C. FROLANDER ET AL 2,155,588
TYPOGRAPHICAL COMPOSING AND DISTRIBUTING MACHINE
Filed April 28, 1937 7 Sheets-Sheet 5

April 25, 1939. F. C. FROLANDER ET AL  2,155,588
TYPOGRAPHICAL COMPOSING AND DISTRIBUTING MACHINE
Filed April 28, 1937   7 Sheets-Sheet 6

INVENTORS
F. C. Frolander
H. A. Burt
BY Morrison, Kennedy & Campbell
ATTORNEYS

April 25, 1939. F. C. FROLANDER ET AL 2,155,588
TYPOGRAPHICAL COMPOSING AND DISTRIBUTING MACHINE
Filed April 28, 1937   7 Sheets-Sheet 7

INVENTORS
F. C. Frolander
H. G. Burt
BY
Morrison, Kennedy & Campbell
ATTORNEYS

Patented Apr. 25, 1939

2,155,588

UNITED STATES PATENT OFFICE 2,155,588

TYPOGRAPHICAL COMPOSING AND DISTRIBUTING MACHINE

Frank C. Frolander, Elizabeth, N. J., and Harold A. Burt, St. Albans, N. Y., assignors to Mergenthaler Linotype Company, a corporation of New York Application April 28, 1937, Serial No. 139,436

32 Claims. (Cl. 199—20)

This invention relates to typographical composing and distributing machines, such as "Linotype" machines of the general organization represented in Letters Patent of the United States to O. Mergenthaler, No. 436,532, wherein circulating matrices are released from a magazine in the order in which their characters are to appear in print and then assembled in line, the composed line transferred to the face of a slotted mold, the mold filled with molten metal to form a slug or "linotype" against the matrices which produce the type characters thereon, and the matrices thereafter returned through distributing mechanism to the magazine from which they started.

More particularly, the present improvements are directed to a machine capable of being equipped with matrix fonts comprising ninety different characters suitable for the more usual composition or "straight" matter or with matrix fonts comprising only seventy-two characters suitable for head letter and display work, etc. These improvements will best be understood from the detailed description to follow.

In the accompanying drawings, the improvements are shown in connection with a machine equipped with four main magazines and four auxiliary magazines and wherein the main magazines and auxiliary magazines, respectively, are mounted in shift frames movable upwardly and downwardly to locate the upper or lower pairs in operative position. However, it should be understood that they are equally applicable to machines of other kinds, including those equipped with but a single pair of magazines. In short, the invention is shown merely in preferred form, by way of example, and obviously many changes and modifications may be made therein without departing from its spirit. It is, therefore, to be understood that the invention is not limited to any specific form or embodiment, except insofar as such limitations are specified in the claims.

Referring to the drawings.

In the embodiment illustrated, the machine is equipped with four main magazines $A^1$, $A^2$, $A^3$ and $A^4$ and four auxiliary magazines indicated generally by the letter B. Of the main magazines, the second and fourth $A^2$ and $A^4$ are of the regular or standard form and provided each with ninety-one grooved channels spaced apart in the usual way to adapt them to contain the ordinary ninety character matrix fonts; whereas the first and third magazines $A^1$ and $A^3$, although of the same width as the other magazines, are provided each with only seventy-three grooved channels spaced apart in a different manner to adapt them to contain the seventy-two character display fonts. The auxiliary magazines B are provided each with thirty-four grooved channels, as usual. The series of main and auxiliary magazines are carried, respectively, in shift frames $A^5$ (although that for the auxiliary magazine is not shown) which are arranged to be raised and lowered to bring either the upper two or the lower two magazines into operative position. While there is thus provided two distinct pairs each of main and auxiliary magazines alternately usable, the invention is equally applicable to a single pair of main magazines and will be so described hereinafter, at least insofar as the release of matrices for assembly is concerned, and except where it is necessary to refer to the auxiliary magazines to describe features which are common to both and operably interconnected.

Although not involved in the instant invention, it might be stated at this point that the magazines both of the main and auxiliary banks are raised or lowered to bring a selected pair into operative position by means of a hand operated crank handle located at the front of the machine through mechanism which is adequately described in our copending application, Serial No. 89,105, filed July 6, 1936, reference to which may be had for a more detailed description of the parts.

In order to cooperate with both of the operative magazines (which in the drawings have been illustrated as the top pair), the channeled raceway or front plate C (see Figs. 11 and 12) is provided with two channeled throats $C^1$ and $C^2$, the former or upper throat $C^1$ having its guide plate $c^1$ spaced apart to cooperate with the matrix columns or channels in the top magazine $A^1$ (and likewise with the third magazine $A^3$ when the two lower magazines are in operative position), and the lower throat $C^2$ having its guide plates $c^2$ at their upper ends spaced apart to aline with short intermediate guide plates $C^3$ secured to a fixed bridge bar $C^4$, the short intermediate guide plates $C^3$ being spaced apart to cooperate with the matrix channels of the second magazine $A^2$ (and likewise with the fourth magazine when the latter is in operative position). The bridge bar $C^4$ sustaining the intermediate guide plates $C^3$ (see Fig. 14) is formed at its ends with enlarged block portions adapted to be secured to the machine frame adjacent the opposite lateral edges of the magazines.

The throat $C^1$ includes a rigid back plate $C^5$, a lighter front plate $C^6$ and end members $C^7$ formed integral with the back plate, and is pivotally mounted (see Figs. 2 and 11) on a cross rod $C^8$ journalled in fixed brackets on the machine in order that said throat may be swung forwardly when desired for access to the magazines and escapement mechanism. When the throat is in its active position (see Fig. 11), it registers with a seventy-two character matrix magazine and, in order that it may be properly located, it is provided with a pair of banking screws $c^3$, one at each end, arranged to bank against fixed lugs on the machine frame.

Figure 1:
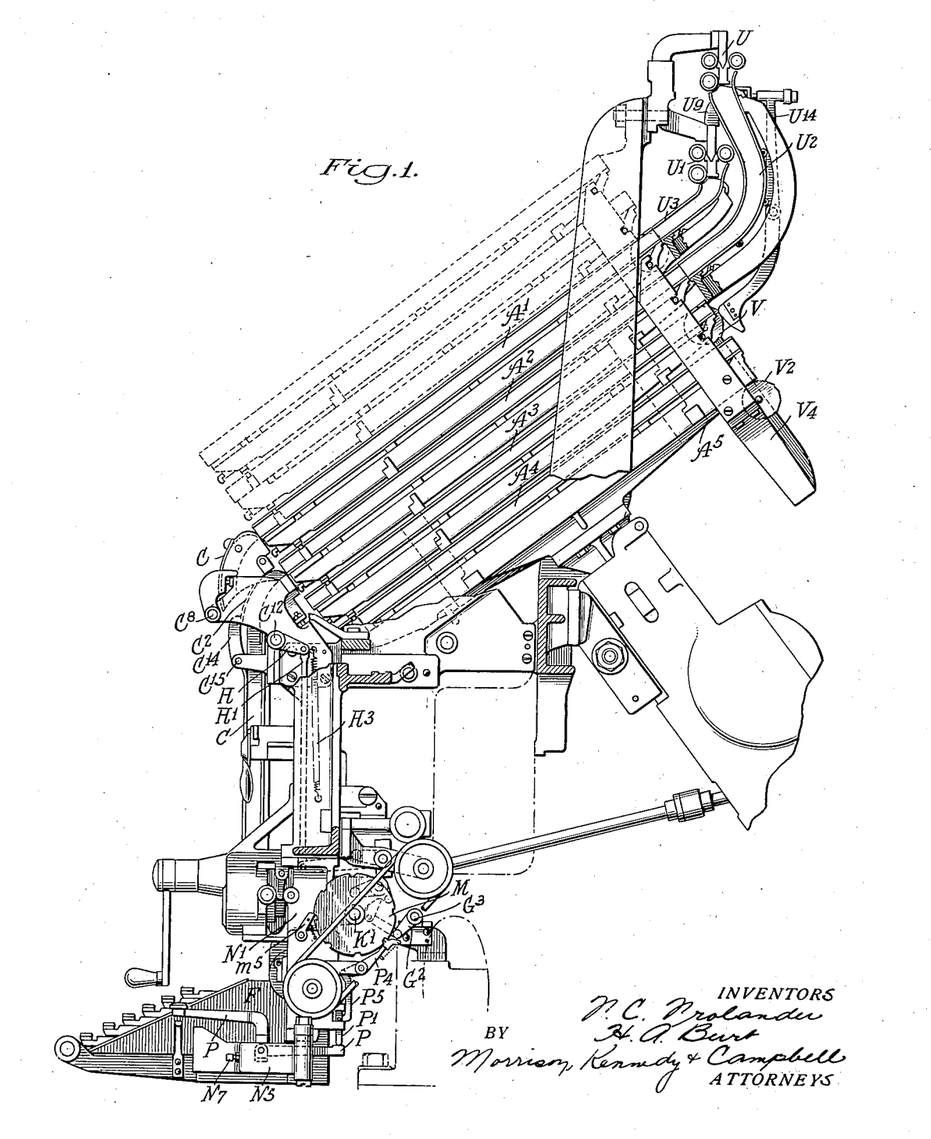
Fig. 1 is a side elevation of the upper portion of a Linotype machine equipped with the present improvements.
Figure 2:
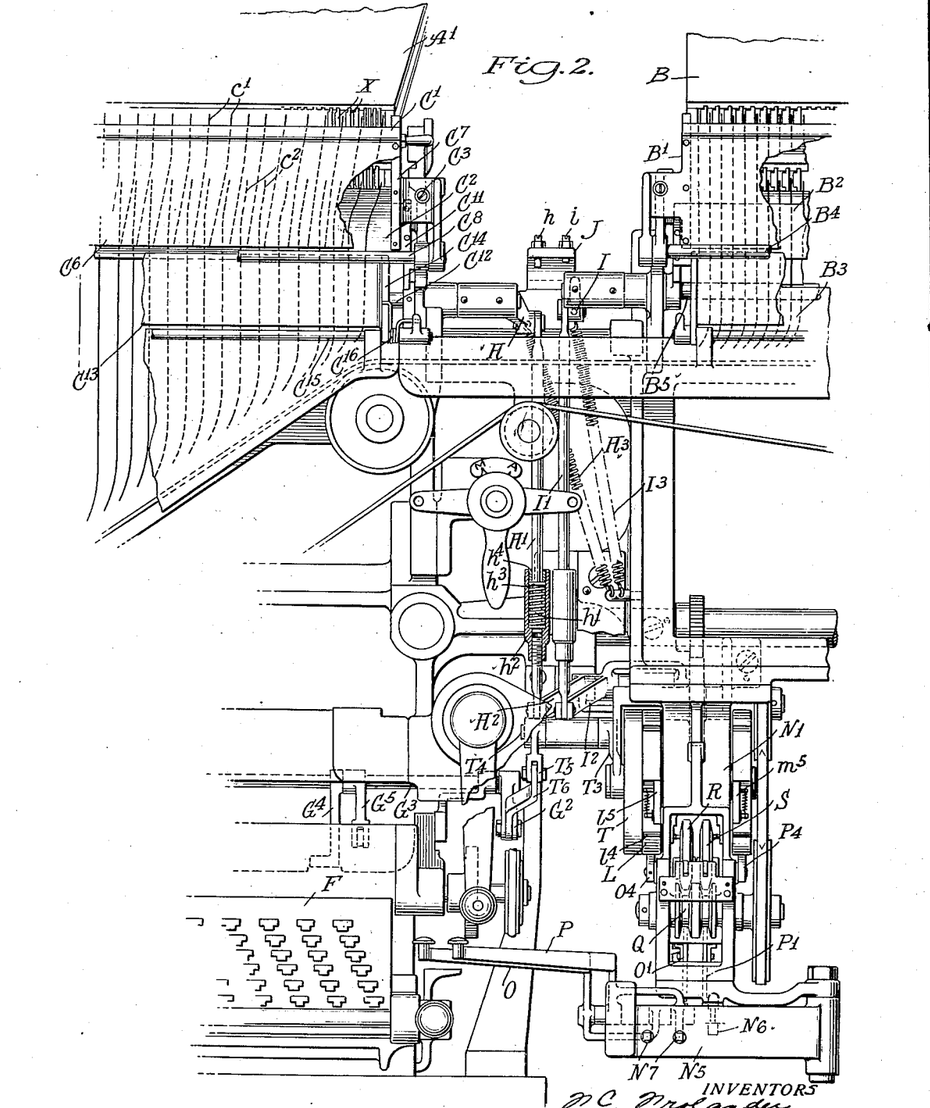
Fig. 2 is a partial front elevation, showing the mechanism for selecting a ninety character or seventy-two character matrix font for use.
Figure 11:
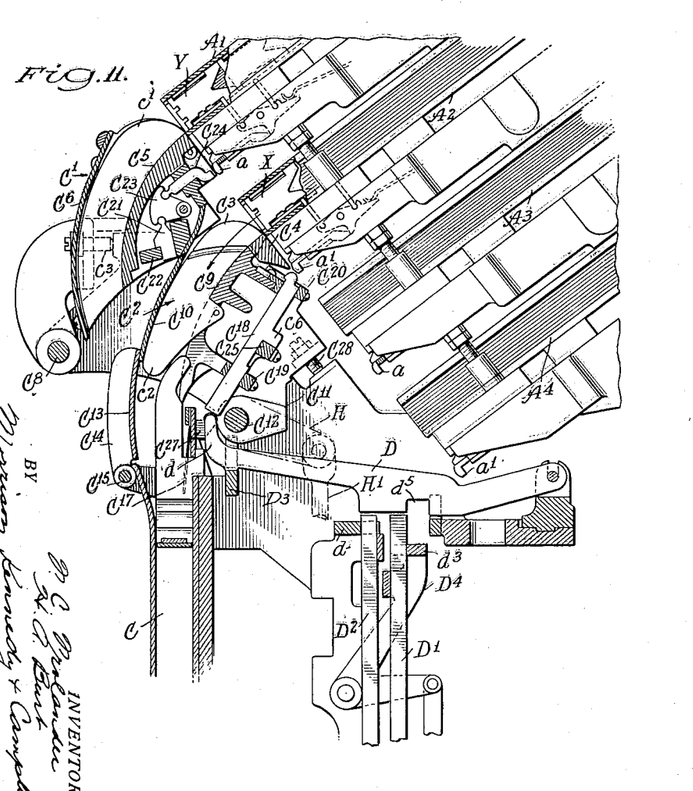
Fig. 11 is a partial vertical sectional view through the assembler throats and showing the parts in the position wherein the second magazine from the top (containing a ninety character matrix font) is connected with the assembler raceway.
Figure 12:
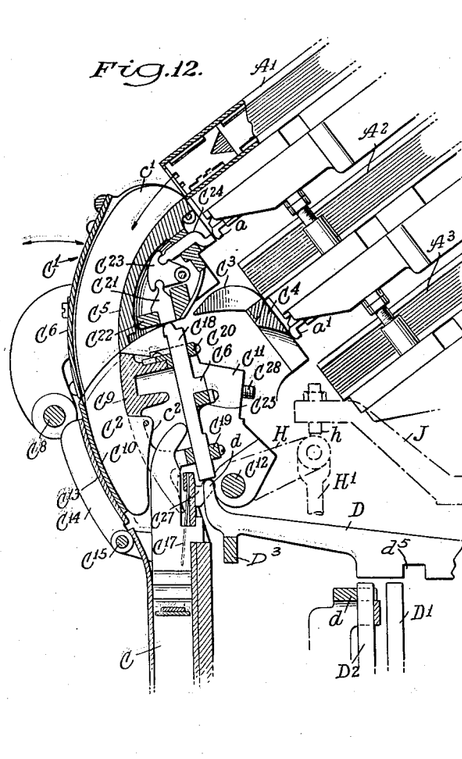
Fig. 12 is a vertical sectional view similar to Fig. 11, but showing the parts in the position wherein the top magazine (containing a seventy-two character matrix font) is connected with the assembler raceway.
Figures 13, 14:
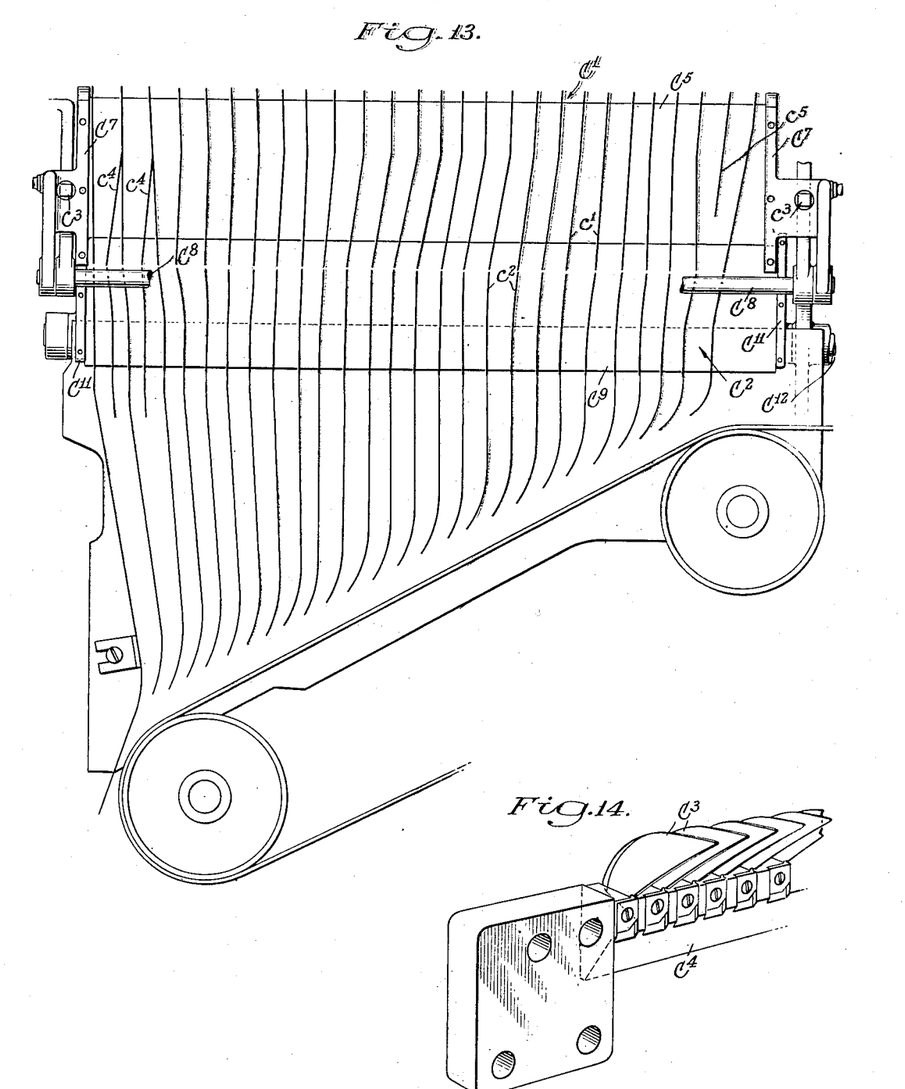
Fig. 13 is a front view of the assembler throats and raceway, with the front plates removed, to show the disposition of the partition plates.
Fig. 14 is a perspective view of a bank of short partition plates located at the mouth of the lower magazine in operative position.

The throat $C^2$ likewise includes a rigid back frame member $C^9$, a front closing plate $C^{10}$ and side members $C^{11}$ and is mounted on a cross rod $C^{12}$ journalled in bearings in the machine frame, being adapted to be swung as a unit from the position shown in Fig. 11, wherein its guide plates $c^2$ register with the short intermediate guide plates $C^3$, to the position shown in Fig. 12, wherein its guide plates register with the guide plates $c^1$ of the upper assembler throat $C^1$. From what has been said, it will be apparent that when the lower assembler throat $C^2$ is in the position shown in Fig. 11, it will be effective to guide the matrices released from the ninety character matrix magazine $A^2$ down into the assembler raceway C; whereas when it is in the position shown in Fig. 12, it forms a continuation of the upper assembler throat $C^1$ and will be effective to guide the matrices released from the upper seventy-two character matrix magazine $A^1$ down into the raceway C. When the assembler throat $C^2$ is in the former position, i. e., wherein it registers with the magazine $A^2$, the space between its front plate $C^{10}$ and the front plate of the assembler raceway C is closed by an auxiliary front plate $C^{13}$ carried by a pair of arms $C^{14}$ located one at each end thereof and pivotally mounted on a horizontal cross rod $C^{15}$ located at the front of the machine (see Fig. 2). In this position of the parts, the auxiliary closing plate rests against the front plate of the assembler throat $C^2$ and is held in this position by torsion springs $C^{16}$ (only one of which is shown), reacting against the arms $C^{14}$ and having an anchorage in a fixed part of the machine (Fig. 2). When the assembler throat $C^2$ is swung from the position shown in Fig. 11 to the position shown in Fig. 12, the front plate $C^{10}$ thereof merely slides along inside of the auxiliary front plate $C^{12}$ which is held in contact therewith by the torsion springs, just alluded to.

At this point, it might be stated that because of the larger number of channels in the ninety character matrix magazine than in the seventy-two character matrix magazine, the lower assembler throat $C^2$ is provided with a greater number of partitions or guide plates $c^2$ than the upper assembler throat $C^1$. Since the guide plates must register however, when the assembler throat $C^2$ forms a continuation of the assembler throat $C^1$, there are provided (see Fig. 13) in the upper assembler throat, two deflector plates $c^4$ associated one with each of the two leftmost partitions, and which serve to by-pass two of the channels formed by the guide plates in the lower assembler throat under such conditions. At the right end of the upper assembler throat, there is one partition $c^5$ which does not have a corresponding partition in the lower assembler throat, but this presents no difficulty since two of the channels in the upper assembler throat merely feed into one channel in the lower assembler throat, as will be observed. It might also be stated that the partition plates in the lower assembler throat $C^2$ are disposed in front of the partition plates in the assembler raceway C, and for this reason both sets of partition plates are curved in their adjacent edges so that they will maintain their same closely spaced relation in either position of the assembler throat $C^2$. Furthermore, it will be noted that, inasmuch as the matrices, upon being released from their respective magazines, will be directed first outwardly and then inwardly in their passage to the assembler raceway C, there is provided (see Fig. 11) a spring plate $C^{17}$ at the top of the assembler raceway, against which the matrices strike upon entering so as to avoid damage thereto.

Each of the magazines is provided with a series of matrix releasing escapements $a$ and $a^1$ adapted to be actuated by a series of escapement actuating devices $C^{18}$ carried by the movable assembler throat $C^2$. These actuating devices are arranged for limited up and down movement and guided near their lower ends in slots formed in a cross bar $C^{19}$ integral with and arranged at the rear of the back plate $C^9$ of the assembler throat $C^2$, and at the top by a comb plate $C^{20}$ secured to said back plate, likewise at the rear. When the assembler throat $C^2$ is in the position shown in Fig. 11, the devices $C^{18}$ will cooperate directly with the escapement plungers $a^1$ of the ninety character matrix magazine and, upon movement in an upward direction under the control of the keyboard, will operate the associated plungers to effect the release of the corresponding matrices from the magazine. When the assembler throat $C^2$ is swung to the position shown in Fig. 12, so as to complete the passageway for the matrices from the upper seventy-two character matrix magazine to the assembler raceway, the escapement actuating devices $C^{18}$ are swung as a unit so as to cooperate at their upper ends with a series of small elements $C^{21}$ arranged for limited up and down movement in a slotted member $C^{22}$ mounted at the rear of the upper assembler throat $C^1$. The movement of the elements $C^{21}$ is transmitted through a corresponding series of pivot plates $C^{23}$ to a corresponding series of elements $C^{24}$ likewise mounted at the rear of said assembler throat and which cooperate in turn with the escapement plungers $a$ of the upper or seventy-two character matrix magazine. The connections between the elements $C^{21}$ and $C^{24}$ and the pivot plates are of a swivel character, so that as the elements $C^{21}$ are moved upwardly under the action of the underlying escapement actuating devices $C^{18}$, the corresponding plungers $a$ will be pressed rearwardly to effect the release of the appropriate matrices from the upper magazine.

Figures 3, 4:
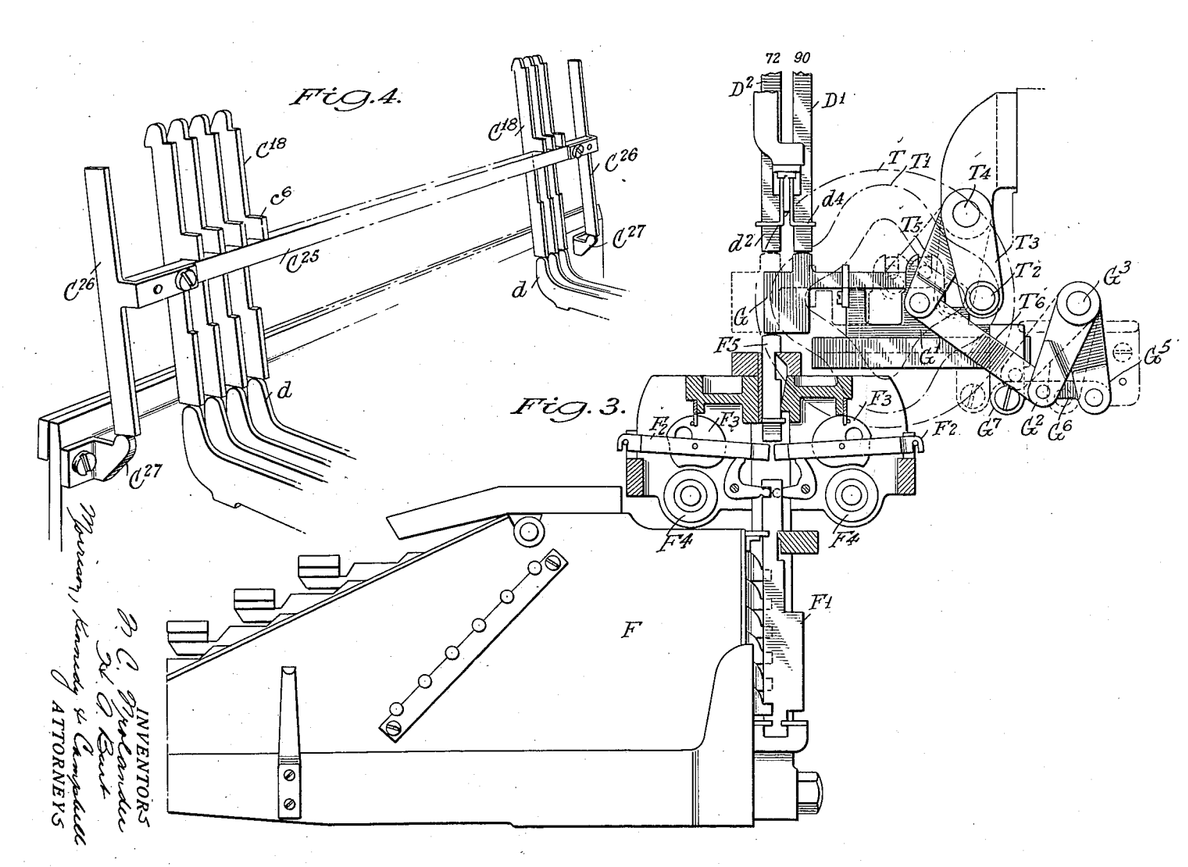
Fig. 3 is a partial vertical section taken on a fore-and-aft plane through the machine and illustrating a portion of the key controlled mechanism for selecting one series or the other of the escapement actuating reeds, there being one set of reeds for effecting the release of matrices from a seventy-two character matrix magazine and another set for effecting the release of matrices from a ninety character matrix magazine.
Fig. 4 is a perspective view of a series of intermediate reeds and which is adjustable to effect a connection between the main series of reeds and the escapement mechanism of either a seventy-two or ninety character matrix magazine.

For reasons hereinafter pointed out, it is essential that the escapement actuating devices $C^{18}$ swing about their lower ends as pivots during the movement of the assembler throat $C^2$ from one position to another, but since the lower ends of these devices are actually offset from the axis upon which the assembler throat itself pivots, some means must be provided to compensate for this offset relation. Accordingly, the devices $C^{18}$ are provided each with a rearwardly projecting lug $c^6$ overlying a cross rod $C^{25}$ connected at its opposite ends to a pair of members $C^{26}$ arranged in parallel relation with the reeds and at the opposite ends of the set. The members $C^{26}$ are likewise guided in slots similar to those which guide the actuating devices, but directly beneath them there is provided for each, a fixed lug $C^{27}$ (see Fig. 4) screwed to a fixed part of the machine frame and formed with rounded surfaces with which said members cooperate at their lower ends. According to this arrangement, when the assembler throat $C^2$ is swung about its pivot from the position shown in Fig. 11 to the position shown in Fig. 12, the members $C^{26}$ will likewise swing about their respective lugs as pivots and, in doing so, will slide upwardly with respect to the assembler throat. The upward movement of the cross rod $C^{25}$ occasioned thereby will, through the lugs $c^6$ on the reeds, cause the latter likewise to move upwardly, so that actually their lower ends pivot about an imaginary axis. When the assembler throat is swung back from the position shown in Fig. 12 to the position shown in Fig. 11, the members $C^{26}$ will slide downwardly with respect to the assembler throat, permitting the reeds to do likewise, so that the lower ends of the reeds will always have a constant location, irrespective of the position of the assembler throat. At this point, it might be stated that when the assembler throat $C^2$ is swung to the position shown in Fig. 11, its location is determined by an adjustable banking screw $C^{28}$ which banks upon a surface presented by the fixed frame of the machine, so as always to insure the proper positioning of the assembler throat to receive the matrices released from the ninety character matrix magazine.

The escapement actuating devices $C^{18}$ are operated through the medium of a series of horizontal levers D (Figs. 4, 11 and 12) pivotally mounted at their rear ends and arranged to be operated by one or another of a series of underlying vertical reeds $D^1$ and $D^2$, one series $D^2$ located at the front, being used when the operator is composing from the seventy-two character matrix magazine and the other series $D^1$, located at the rear, being used when the operator is composing from the ninety character matrix magazine. The levers D terminate at their front ends in vertical portions $d$ adapted to coact with the lower ends of the escapement actuating devices $C^{18}$ and, in their normal positions, rest near their front ends upon an underlying fixed cross bar $D^3$. Since the normal position of the levers D is the same, irrespective of the position of the assembler throat $C^2$, it can be understood now why the escapement actuating devices $C^{18}$, in moving with the assembler throat, must rotate about an imaginary axis.

Both sets of reeds $D^1$ and $D^2$ are arranged for limited up and down movement to effect the release of the matrices in the manner hereinbefore described from the respective magazines, and for this purpose are guided at their upper and lower ends in comb plates $d^1$, $d^2$, $d^3$ and $d^4$ (see Figs. 3 and 11), the comb plates $d^1$ and $d^2$ for the front set of reeds being fixed, whereas only the lower comb plate $d^4$ for the rear set of reeds is fixed, the upper one $d^3$ being movable in a limited fore-and-aft direction for a purpose which will be evident hereinafter. The reeds in turn are selectively operated as usual from the keyboard F of the machine through the medium of a set of vertical bars $F^1$ adapted to be selectively raised upon the operation of a corresponding finger key to release a corresponding pivotally mounted cam yoke $F^2$ which, upon release, allows its associated cam $F^3$ to engage a constantly operating power driven roller $F^4$ in a manner to effect the upward movement of a corresponding one of a series of short vertical rods $F^5$ overlying the cam yokes and slidably arranged in the keyboard frame. The construction of the keyboard and power-operated cam control devices is so well known as to warrant no further description here. Suffice it to say, when the short rods $F^5$ are raised by the operation of their respective keys, they will, through the medium of a series of interposed pivoted levers G (which, incidentally, are shiftable in a fore-and-aft direction to cooperate with either set of reeds $D^1$ or $D^2$) move the reeds upwardly to effect the release of corresponding matrices from one or the other of the magazines, as previously described, depending, of course, upon which set of reeds is active. It will be understood that the escapement actuating devices $C^{18}$ correspond in number to the number of channels in the ninety character matrix magazine, so that some of them will be idle when composing from the seventy-two character matrix magazine.

In accordance with the present invention, the assembler throat $C^2$ is shifted to its different positions and the interposed pivoted levers G shifted to cooperate with the appropriate set of reeds $D^1$ or $D^2$, depending upon which of the magazines it is desired to use, under the control of a finger key located adjacent the keyboard and within easy reach of the operator. The mechanism for shifting the assembler throat associated with the auxiliary magazines is similar to that of the main magazines and, since this fact will facilitate describing them together, it might be helpful at this point to mention briefly the differences existing between the assembler throats associated with the main magazines and those associated with the auxiliary magazines. Briefly, these differences reside in the fact that both the upper and lower assembler throats $B^1$ and $B^2$ associated with the auxiliary magazines B have the same number of partition plates, since all of the auxiliary magazines are provided with thirty-four grooved matrix channels and, of course, the partitions in the assembler raceway $B^3$ are the same length, since the matrices released from the auxiliary magazines are deposited onto the assembler belt in a portion thereof which, at the time it travels past the auxiliary magazines, pursues a horizontal path. The only other difference resides in the fact that the matrices are released from the auxiliary magazine by the operation of a group of keys of the keyboard associated with the main magazine and corresponding in number to the channels in the auxiliary magazine, the release of the matrices being effected through the medium of bail box connections (not shown) and a group of the main reeds $D^1$ (those associated with the 90 character matrix magazine) corresponding to the group of keys of the main keyboard just alluded to. It is for this purpose (see Fig. 11) that the upper comb guide plate $d^3$ for said rear set of reeds $D^1$ is movable in a fore-and-aft direction, being carried by a frame shiftable through the medium of a bell crank lever $D^4$ operated from the front of the machine. It might also be stated that the mechanism which effects the cooperation between the group of reeds $D^1$ and the bail box connections for operating the auxiliary magazines is also effective to shift a corresponding group of the levers G rearwardly to cooperate with said group of reeds $D^1$ in the event the levers G occupy their forward position, that is, the position wherein they cooperate with the front set of reeds $D^2$ associated with the 72 channel matrix magazine. The mechanism for conditioning the machine for the release of matrices from the auxiliary magazines by the operation of the main keyboard is well known and need not be described in detail here, reference being had, if desired, to the Rogers Patent No. 1,791,687 for a complete understanding of the devices referred to. Suffice it to say, when the operator desires to compose from the auxiliary magazines, the operation of the mechanism, previously referred to, will shift the reeds $D^1$ rearwardly at their upper ends, so as to bring them into register with notches $d^5$ formed in the bottom edges of the levers D, so that there will be sufficient clearance for the operation of the reeds without affecting the operation of the levers and, at the same time effect the cooperation of lugs not shown, but which are associated with a group of the reeds, with the bail bar connections, previously alluded to. The same mechanism also acts to shift those levers G corresponding to said group of reeds rearwardly into cooperative relation with said reeds, in the event the levers G occupy their forward position, wherein they cooperate with the reeds $D^2$ associated with the 72 channel magazine.

With the exception of the differences just noted, the throats $B^1$ and $B^2$ associated with the auxiliary magazines are the same as those associated with the main magazines, the upper assembler throat $B^1$ being pivotally mounted on a cross shaft $B^4$ and the lower assembler throat $B^2$ being mounted on a cross rod $B^5$ in a similar manner and for the same purpose as the assembler throats $C^1$ and $C^2$ associated with the main magazines are mounted on the cross rods $C^8$ and $C^{12}$.

The mechanism for swinging the assembler throats of the main and auxiliary magazines and for shifting the interposed pivoted levers G to bring one or another of the sets of reeds $D^1$ and $D^2$ under the control of the keyboard, will now be described. As will be seen in Fig. 2, the rock shafts $C^{12}$ and $B^5$, upon which the swinging throats $C^2$ and $B^2$ are mounted, extend beyond the magazine supporting frames, one to the right, and the other to the left and, on the opposed ends of these rock shafts, there are pinned, respectively, a pair of arms H and I connected at their free ends by a pair of vertical rods $H^1$ and $I^1$, to a corresponding pair of levers $H^2$ and $I^2$, cam operated in a manner hereinafter to be described. The assembler throats $C^2$ and $B^2$, because of their weight, are counterbalanced by a pair of tension springs $H^3$ and $I^3$ connected one to each of the arms H and I at the ends thereof and having an anchorage in the machine frame. When the levers $H^2$ and $I^2$ are operated to move the arms H and I upwardly, the latter will, through their associated rock shafts $C^{12}$ and $B^5$, swing the assembler throats from the positions wherein they cooperate with the lower magazines in operative position to the positions wherein they cooperate with the upper magazines in operative position, these latter positions being determined by a pair of banking screws $h$ and $i$ threaded into a bracket J on the main machine frame and against which the arms bank in their uppermost position, these banking screws being adjustable in order to secure proper registry of the lower assembler throats with the upper assembler throats. And when the levers $H^2$ and $I^2$ permit the vertical rods $H^1$ and $I^1$ to move downwardly, the assembler throats $C^2$ and $B^2$ will be returned to the positions in which they register again with the lower magazines in operative position.

In order to insure the full movement of the pivoted assembler throats, the levers $H^2$ and $I^2$ have a limited overthrow in the direction which effects the upward movement of the rods $H^1$ and $I^1$. In order to accommodate this overthrow movement, the rods $H^1$ and $I^1$ are made each in two parts, the movement of the lower part being transmitted to the upper part through the medium of a compression spring $h_2{}^1$ which reacts between an annular shoulder at the base of a sleeve $h^2$ threaded on the lower member and an enlarged portion $h^3$ formed at the lower end of the upper part of the rod. The enlarged portion $h^3$ abuts against a bushing $h^4$ threaded into the sleeve at its upper end and through which the upper portion of the rod extends. According to this arrangement, the rods $H_2{}^1$ and $I^1$ will move upwardly through the action of the levers $H^2$ and $I^2$ until they are arrested by the banking stops $h$ and $i$, previously referred to, and any excess movement of the levers will be accommodated by the compression of the springs $h^2$. This arrangement will also prevent damage to the parts in the event some interference is presented to the movement of the pivoted assembler throats. It will be understood, of course, that the springs $h^2$ are stronger than the counterbalancing tension springs $H^3$ and $I^3$.

The levers $H^2$ and $I^2$ through which the vertical rods are operated (see Figs. 5, 8 and 9) are pivotally mounted on a shaft K secured in the machine frame and formed each with a pair of spaced bearings $H^4$, $I^4$ connected together by rigid bail members, so that each lever will have a portion which lies just above one or another of a pair of cams L and M journalled on a shaft $K^1$. Each lever is formed with a forwardly projecting arm $H^5$, $I^5$ connected through the medium of a link $H^6$, $I^6$ with another pivotally mounted arm $H^7$, $I^7$ equipped at its front end with an antifriction roller $H^8$, $I^8$, arranged to track in a groove $L^1$, $M^1$ formed one in the face of each of the cams, the roller $H^8$ associated with the connections for the assembler throat $C^2$ of the main magazines cooperating with the cam L at the left, and the roller $I^8$ associated with the connections for the assembler throat $B^2$ of the auxiliary magazines cooperating with the cam M at the right. The grooves $L^1$ and $M^1$ in the cams, which incidentally are in surfaces facing each other, are formed each with four high portions and four intermediate low portions spaced 90° apart.

When the cams L and M are in a position wherein the cam followers or rollers $H_2^8$, $I^8$ are located in low portions of the grooves, the assembler throats $C^2$ and $B^2$ associated with the main and auxiliary magazines will be in positions corresponding to that shown in Fig. 11, that is, in cooperative relation with the lower magazines in operative position. In order to effect the shifting of the assembler throats in the manner hereinbefore described, the cams L, M, are rotated in a clockwise direction, looking at the machine from the right through angles of 45°, and when thus rotated, a high portion of the cam grooves will arrive opposite the cam followers, thus causing the levers $H^2$, $I^2$ to be swung upwardly to the position shown in Fig. 8, thereby moving the connecting rods $H^1$, $I^1$ upwardly, and causing the assembler throats to be swung to a position corresponding to that shown in Fig. 12. And when the cams are rotated in the same direction through another angle of 45°, another low portion of the cams will arrive opposite the cam followers, thus permitting the levers and vertical connecting rods to be moved downwardly to return the assembler throats to a position corresponding to that shown in Fig. 11. While the action of the cams is positive, there may be some play in the parts, and it is for this reason in addition that the springs $H^3$, $I^3$ are provided, in order to insure a full return of the assembler throats.

Figures 5, 6, 7:
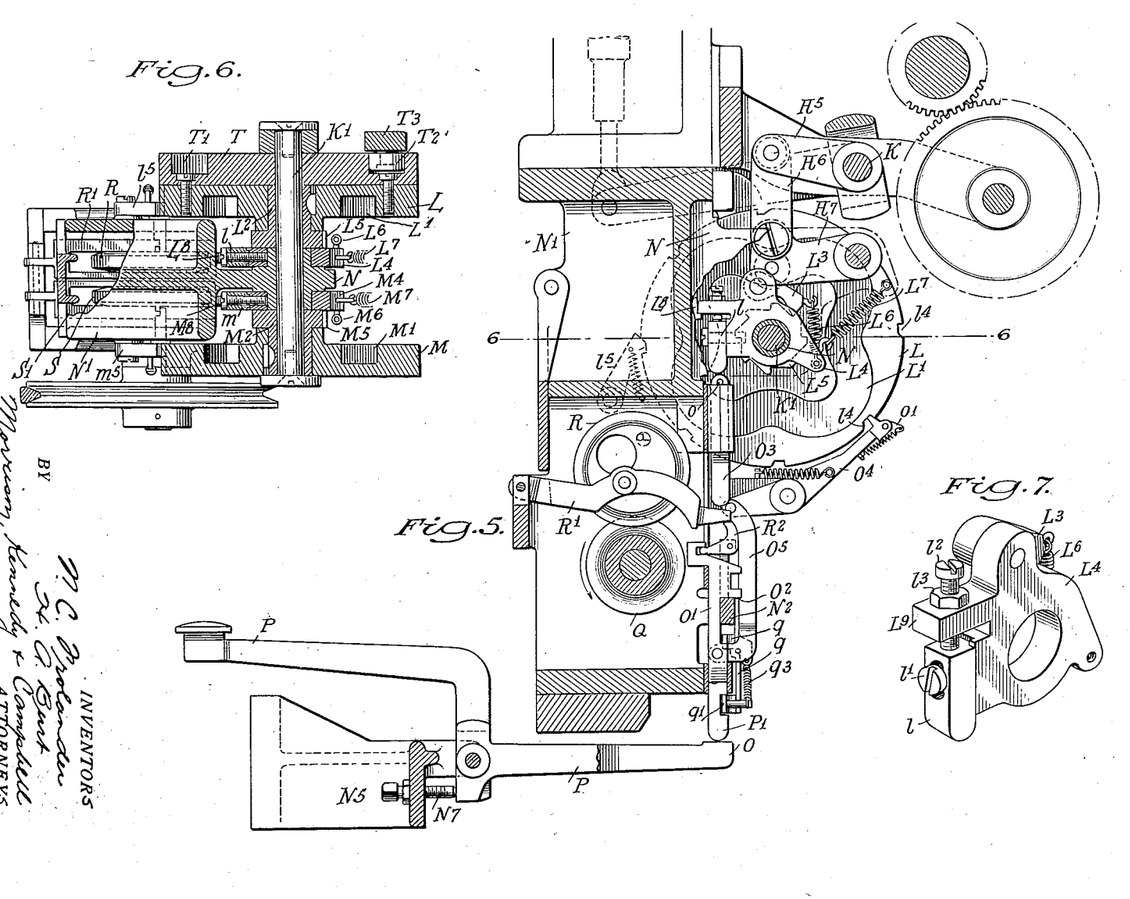
Fig. 5 is a partial vertical section taken on a fore-and-aft plane through the machine and illustrating the key controlled mechanism for effecting a connection between the assembler raceway and a seventy-two or ninety character matrix magazine.
Fig. 6 is a horizontal section on line 6—6 of Fig. 5.
Fig. 7 is a perspective view of a portion of the key controlled mechanism shown in Fig. 5.

As shown in Fig. 6, the shaft $K^1$, upon which the cams are mounted, is supported by a rearwardly extending portion N of a fixed bracket $N^1$, the portion N being located in a position midway between the cams, while the cams themselves are keyed, respectively, to sleeves $L^2$ and $M^2$ journalled on the shaft. Rotation of the cams through increments of 45° is effected through the medium of a pair of pawl and ratchet mechanisms, one being provided for each of the cams. The pawls $L^3$ and $M^3$ are pivotally mounted on members $L^4$ and $M^4$ rotatably mounted on the bracket extension N and at the opposite faces thereof, the pawls being arranged to engage, respectively, ratchet teeth $L^5$ and $M^5$ formed in the peripheral edges of enlarged portions of the sleeves $L^2$ and $M^2$ to which the cams are keyed. The ratchet teeth formed in the respective sleeves are eight in number, and the pawls are held in engagement therewith by springs $L^6$ and $M^6$ connected thereto and having an anchorage in extensions of the members $L^4$ and $M^4$ with which they are, respectively, associated. Consequently, when the members $L^4$ and $M^4$ are turned from a position corresponding to that shown in Fig. 5 to a position corresponding to that shown in Fig. 8, they will, through the pawl and ratchet mechanisms, actuate the cams through the angle of 45°, previously alluded to and, when the members are released, they will be returned to normal position under the influence of springs $L^7$, $M^7$ connected to the members and anchored in a fixed part of the machine. The normal position of the members $L^4$ and $M^4$ is determined by a pair of banking stops $L^8$ and $M^8$ formed integral with the supporting frame (Figs. 5 and 6) and against which projecting portions, as for instance, $L^9$ on the members abut during the return movement of the latter. During such return movement, the pawls $L^3$ and $M^3$ will merely slide back along the teeth $L^5$, $M^5$ to a position where they are again ready to transmit motion to the cams by the engagement of the next tooth.

The members $L^4$ and $M^4$ are operated to effect the rotation of the cams L and M through power mechanism controlled from keys O and P located at the front of the machine and just to the right of the main keyboard, one key O being for the control of the assembler throat $C^2$ associated with the main magazines and the other for the control of the assembler throat $B^2$ associated with the auxiliary magazines (see Figs. 2 and 5). The power mechanism (see Figs. 5, 6, 8 and 9) includes a continuously rotating roller Q driven through a belt from the intermediate shaft of the machine and a pair of cams R and S eccentrically mounted in yokes $R^1$ and $S^1$ which are pivoted at one end in the fixed frame and normally held by trip dogs $R^2$ and $S^2$ engaging beneath their free ends in a position in which the cams are above and out of contact with the roller Q, it being understood that the two cam units are one for each of the mechanisms which operate the assembler throats of the main and auxiliary magazines, respectively. The roller Q and cams R, S are preferably of metal, the roller having two V-shaped peripheral grooves and the cams a V-shaped periphery adapted to engage with said grooves. When the keys O and P, which are pivotally mounted adjacent their centers, are depressed, they will, at their rear ends, engage a pair of overlying slides $O^1$ and $P^1$ connected at their upper ends with the trip levers $R^2$, $S^2$ supporting the respective cam yokes $R^1$, $S^1$, so as to actuate the slides upwardly to trip the levers, thereby releasing the yokes and permitting the cams to fall by gravity into engagement with the roller. The cams are thus rotated through a single revolution, much in the same manner as the reed operating cams of the main keyboard and, after one revolution of the cams, their supporting yokes will again come to rest on the levers $R^2$, $S^2$ with the cams out of engagement with the roller, it being understood that in the meantime the keys O and P have been released to allow the levers and slides to return to their normal positions, which are determined by the engagement of shoulders $O^2$, $P^2$, presented one by each of the slides with an underlying fixed portion $N^2$ of the supporting frame.

Figure 8:
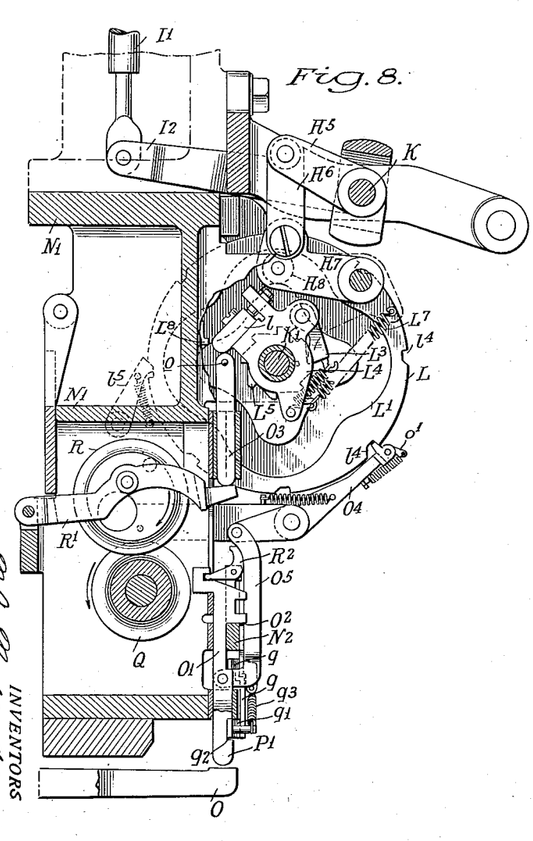
Fig. 8 is a sectional view similar to Fig. 5, but showing the parts in a different operative position.
Figures 9, 10:
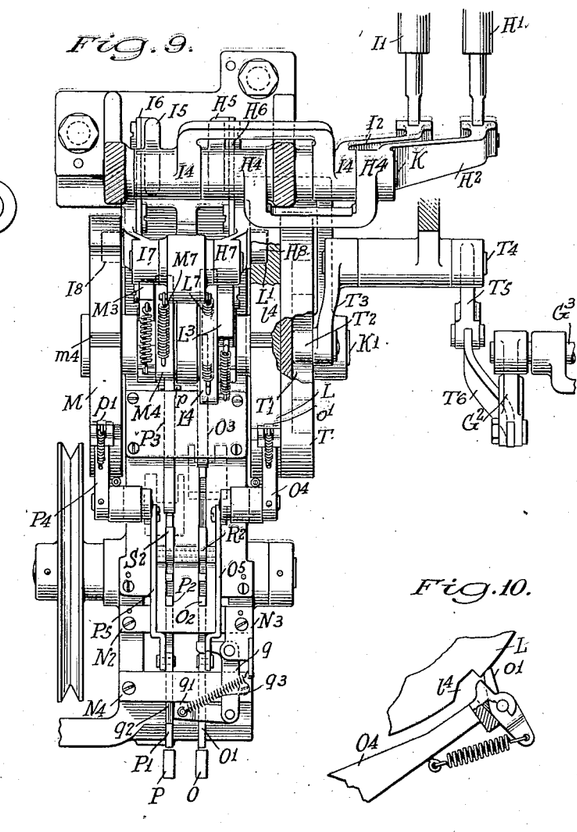
Fig. 9 is a rear elevational view of the portion of the parts shown in Fig. 8.
Fig. 10 is a detail view of a portion of the mechanism shown in Fig. 8 and which acts to prevent overrunning of said mechanism after the operation of the finger key controlling it.

During the rotation of the cams R, S, the cam yokes R¹, S¹ are rocked upwardly, engaging, at their rear ends, a pair of short overlying vertical slides O³, P³ which are positioned one directly beneath a shoe $l$ secured to the member L⁴ and the other directly beneath a similar shoe secured to the other member M⁴ (see Figs. 8 and 9). This upward movement of the slides will effect the cam actuating movement of the members L⁴, M⁴, previously alluded to and, of course, when the cam yokes are returned to normal position after a revolution of the cams R, S, the return movement of said members will be effected in the manner previously mentioned, this return movement causing the short slides O³, P³ to be returned positively to their normal position, which is determined by pins $o$, $p$, located in the upper ends thereof and which bank against a fixed portion of the frame in which the slides are mounted.

In order to secure a proper adjustment of the parts, the shoes on the members L⁴, M⁴ are adjustable, each shoe being tongued and grooved to its respective member (see Fig. 7) and fastened thereto by a screw and slot connection $l^1$. Vertical adjustment of the shoe with respect to the member is obtained by a set screw $l^2$ threaded through the projection L⁹ and banking against the shoe at the top, the adjustment being maintained by a lock nut $l^3$.

In order to prevent overrunning of the cams L and M, there are provided a pair of pawls $o^1$ and $p^1$, one associated with each cam and carried at the ends of a pair of centrally pivoted levers O⁴, P⁴, spring urged toward the cams. The pawls are pivotally mounted on the levers and adapted to engage in one or another of a plurality of recesses $l^4$, $m^4$ spaced about the peripheral edges of the cams in such a manner that there will be a recess in registry with the pawls when the cams are in any position corresponding to the operable positions of the respective assembler throats. When the finger keys O, P are depressed, the upward movement of the associated slides O¹, P¹ will, through links O⁵, P⁵ connected respectively thereto and also to the corresponding levers O⁴, P⁴, and prior to the engagement of the cams R, S with the roller Q, withdraw the pawls from the recess in which they happen to be seated at the time and, in order that the pawls do not again enter the same recess, in the event the finger keys are released prior to the time that the movement of the cams L, M is inaugurated, they are swung under spring tension to the position shown in Fig. 10, where they will rest upon the outer peripheral edges of their respective cams. As the cams complete the range of movement required to shift the assembler throats from one operative position to another, another recess in the cams will arrive opposite the pawls, which is immediately entered thereby under the action of the spring urged levers O⁴, P⁴. From what has been said, it is obvious that there is no danger that the cams will partake of more than the desired increment of movement for any one depression of the keys. Retrograde movement of the cams L, M is prevented by a pair of spring pressed pawls $l^5$, $m^5$ pivotally mounted on the frame and adapted likewise to engage in the recesses in the peripheral edges of the respective cams, but in the regions thereof opposite the pawls which prevent the cams from overrunning.

Although the mechanisms for operating the assembler throats associated with both the main and auxiliary magazines have been described together, this was done merely because the character of the mechanisms facilitated such description. It will be understood, of course, that actually the mechanisms are operated independently by their respective finger keys and, as a matter of fact, since the operation of both finger keys simultaneously might place too great a load upon the intermediate shaft, means are provided for preventing the simultaneous operation of the keys. Such means, as best shown in Figs. 8 and 9, comprise a small bell crank lever $q$ pivoted on a bracket plate N³ and an interponent $q^1$ loosely connected at one end with the longer arm of said lever and having its other end disposed opposite a notch $q^2$ formed in the vertical slide P¹ associated with the key lever P. The shorter arm of the bell crank lever is held resiliently down upon a shoulder of the other slide O¹ by a light pull spring $q^3$ which also acts to hold the free end of the interponent in sliding contact with the lower edge to a cross guide plate N⁴. Accordingly, when the slide O¹ is raised upon the depression of the key lever O, it will act to rotate the bell crank lever $q$ and cause the interponent $q^1$ to enter the notch $q^2$ in the slide P¹, thus preventing the key P associated with said slide from being depressed. On the other hand, if the key lever P is depressed, the depression of the other key lever O is prevented, since now the bell crank lever $q$ is locked against turning, and the interponent $q^1$ is arrested by banking against the slide P¹, the notch $q^2$ in the slide having been moved out of registry therewith.

It will be recalled that when the assembler throat associated with the main magazines is swung from the position shown in Fig. 11, wherein it cooperates with the ninety character matrix magazine, to the position shown in Fig. 12, wherein it cooperates with the seventy-two character matrix magazine, the interposed pivoted levers G (see Fig. 3) between the short slides F⁵ and the overlying reeds D¹ must be moved forwardly from the position shown in solid lines to the position shown in dotted lines, wherein they will cooperate with the reeds D² for effecting the release of matrices from the seventy-two character matrix magazine. And likewise, when the assembler throat is swung back again to cooperate with the ninety character matrix magazine, the levers must be returned again to the position shown in solid lines. For this purpose, the levers are pivotally mounted in a frame G¹ which is arranged to be slid in a fore-and-aft direction by a cam T similar to those for effecting the swinging movement of the assembler throats and through intermediate connections between the cam and frame. Actually, the cam T is secured to the outer face of the cam L (Figs. 6 and 9) and has a slot T¹ similar to the slot L¹ in said cam, although displaced through an angle of 45° therefrom. The intermediate connections referred to include in part a cam follower T² arranged to track in the slot T¹ and disposed at the end of an arm T³ fast on a rock shaft T⁴ journalled in a fixed part of the machine (see Figs. 3 and 9). The connections further include an arm T⁵ fast on the other end of the rock shaft T⁴ and connected at its lower end through a link T⁶ with another arm G² secured to a rock shaft G³ extending transversely across the machine at the rear of the sliding frame G¹ and journalled in stand brackets G⁴ supported on the fixed frame of the machine (see Fig. 2). On the rock shaft G³ there are pinned two arms G⁵ which are connected at their lower ends through the medium of short links G⁶ to ears G⁷ depending from the sliding frame at its opposite ends (only one of these latter sets of connections being shown). According to this arrangement, when the cam L is turned to move the assembler throat associated with the main magazines, from the position wherein it cooperates with the ninety character matrix magazine to the position wherein it cooperates with the seventy-two character matrix magazine, the cam T receives a similar degree of rotation and, as it is thus turned, the cam follower T² (see Fig. 3) rides from a high portion of the cam slot T¹ to a low portion thereof and, in so doing, will, through the intermediate connecting linkage just described, move the sliding frame G¹, and consequently the levers G, from the position shown in solid lines in Fig. 3 to the position shown in dotted lines therein to bring the reeds for effecting the release of the matrices from the seventy-two character matrix magazine under the control of the keyboard. And, of course, another 45° turn of the cams L and T will swing the assembler throat C² back into operative relation with the ninety character matrix magazine and automatically and simultaneously return the interposed levers G to the solid line position shown in Fig. 3, wherein the reeds for effecting the release of the matrices from the ninety character matrix magazine will be under the control of the keyboard.

The key levers O and P (see Fig. 2) extend to the left, so as to be adjacent the main keyboard of the machine and, since the latter is of the swinging variety, the levers O and P are mounted in a bracket N⁵ pivotally mounted at the right on the frame N¹, so that the bracket can be swung to move the levers away from the main keyboard to give clearance for the swinging movement of the latter. The bracket N⁵ is held in its normal position by a detent N⁶ mounted in the bracket N⁵ and engaging in a recess in the frame N¹. This is the only connection that need be broken when it is desired to swing the bracket N⁵, since the keys themselves do not have any fixed connection with the overlying slides O¹ and P¹ which they operate (see Fig. 5). As shown in Fig. 5, the normal positions of the key levers O and P are determined by adjustable banking screws N⁷, against which the levers rest.

It is believed that the operation of the machine will be perfectly clear without further description.

Having thus described our invention, what we claim is:

1. In a typographical composing machine, the combination with a pair of superposed inclined matrix magazines provided each with a set of escapements, of an assembler entrance including a relatively fixed section to receive matrices discharged from either magazine and a pivoted section adjustable to two different positions to make and break an operative connection between the fixed section and either one of the magazines, escapement actuating devices carried by said pivoted section and movable therewith to two different positions to make and break an operative connection with the escapements of either magazine according to the position of adjustment of the pivoted section, said escapement actuating devices being in non-radial relation with the pivotal axis of the pivoted section, and means for maintaining a radial relation of said escapement actuating devices with an axis offset from said pivotal axis as said section is adjusted from one position to another.

2. In a typographical composing machine, the combination with a pair of superposed inclined matrix magazines provided each with a set of escapements, of an assembler entrance including a relatively fixed section to receive matrices discharged from either magazine and a pivoted section adjustable to two different positions to make and break an operative connection between the fixed section and either one of the magazines, escapement actuating devices carried by said pivoted section and movable therewith to two different positions to make and break an operative connection with the escapements of either magazine according to the position of adjustment of the pivoted section, said escapement actuating devices being in non-radial relation with the pivotal axis of the pivoted section, and means for effecting a relative movement between the escapement actuating devices and said pivoted section as the latter is adjusted from one position to another to maintain a radial relation of said escapement actuating devices with an axis offset from said pivotal axis.

3. In a typographical composing machine, the combination with a pair of superposed inclined matrix magazines provided each with a set of escapements, of an assembler entrance including a relatively fixed section to receive matrices discharged from either magazine and a pivoted section adjustable to two different positions to make and break an operative connection between the fixed section and either one of the magazines, escapement actuating devices carried by said pivoted section and movable therewith to two different positions to make and break an operative connection with the escapements of either magazine according to the position of adjustment of the pivoted section, said escapement actuating devices being in non-radial relation with the pivotal axis of the pivoted section, and a movable frame arranged to cooperate with all of said escapement actuating devices and controlled by devices fixed on the machine as the pivoted section is adjusted from one position to another for maintaining a radial relation of said escapement actuating devices with an axis offset from said pivotal axis.

4. In a typographical composing machine, the combination with a pair of superposed inclined matrix magazines provided each with a set of escapements, of an assembler entrance including a relatively fixed section to receive matrices discharged from either magazine and a pivoted section adjustable to two different positions to make and break an operative connection between the fixed section and either one of the magazines, escapement actuating devices carried by said pivoted section and movable therewith to two different positions to make and break an operative connection with the escapements of either magazine according to the position of adjustment of the pivoted section, said escapement actuating devices being in non-radial relation with the pivotal axis of the pivoted section, and a frame having end members and a cross member, the cross member being arranged to cooperate with means on the escapement actuating devices and the end members with devices fixed on the machine in a manner to provide relative movement between the escapement actuating devices and the pivoted section as the latter is adjusted from one position to another to maintain a radial relation of said escapement actuating devices with an axis offset from said pivotal axis.

5. In a typographical composing machine, the combination of a pair of superposed inclined matrix magazines provided each with a set of escapements, an assembler entrance including a relatively fixed section to receive matrices discharged from either magazine and a pivoted section adjustable to two different positions to make and break an operative connection between the fixed section and either one of the magazines, escapement actuating devices carried by said pivoted section and movable therewith to two different positions to make and break an operative connection with the escapements of either magazine according to the position of adjustment of the pivoted section, a set of levers for operating said actuating devices and cooperating with the actuating devices along a line parallel with but offset from the pivotal axis of the pivoted section, and means for effecting relative movement between the escapement actuating devices and said pivoted section as the latter is adjusted from one position to another to maintain the operative relation between the escapement actuating devices and their operating levers.

6. In a typographical composing machine, the combination with a pair of superposed matrix magazines having differently spaced matrix channels, of an assembler entrance including a relatively fixed section to receive matrices discharged from either magazine, a pivoted section adjustable to two different positions to make and break an operative connection between the fixed section and either one of the magazines, said pivoted section being provided with partitions spaced in accordance with the channel spacing of one of said magazines so as to guide the matrices from said magazine to the fixed section when the pivoted section is in one of its adjusted positions, another relatively fixed section associated with the other magazine for guiding matrices therefrom to the first fixed section when the pivoted section is in its other adjusted position, said second relatively fixed section being provided with partition plates spaced differently from those of the pivoted section, and means for properly guiding the matrices from the second fixed section to the pivoted section when the two are operatively associated irrespective of said difference in partition spacing.

7. A combination according to claim 6, wherein the means for properly guiding the matrices from the second fixed assembler entrance section to the pivoted secction includes supplemental partition plates arranged in one of said sections.

8. A combination according to claim 6, wherein the means for properly guiding the matrices from the second fixed assembler entrance section to the pivoted section includes supplemental partition plates arranged in said fixed section.

9. In a typographical composing machine, the combination with a pair of superposed matrix magazines, of an assembler entrance including a pair of relatively fixed sections associated one with each magazine, a relatively fixed section common to both magazines, an intermediate pivoted section adjustable to two different positions operatively to connect the common section with either one of the other fixed sections, said pair of relatively fixed sections having differently spaced partitions, and said pivoted sections having partitions spaced to correspond to those of one of said fixed sections, and means for properly guiding matrices from the other fixed section into the pivoted section when the two are operatively connected irrespective of the difference in spacing of their respective partitions.

10. In a typographical composing machine, the combination with a pair of superposed inclined matrix magazines, of an assembler entrance including a relatively fixed partitioned section to receive matrices discharged from either magazine and a pivoted partitioned section adjustable to two different positions to make and break an operative connection between the fixed section and either one of the magazines, the partitions in said sections being in alinement and having their opposed ends reduced in width and adjacently spaced in overlapping edge to edge relation and so shaped as to maintain substantially the same spacing of the end edges in both positions of the pivoted section.

11. In a typographical composing machine, the combination with a pair of superposed inclined matrix magazines, of an assembler entrance including a relatively fixed partitioned section to receive matrices discharged from either magazine and a second pivoted partitioned section adjustable to two different positions to make and break an operative connection between the fixed section and either one of the magazines, the partitions in said sections being in alinement and arranged in overlapping edge to edge relation, such that those in the pivoted section are located above those in the fixed section in one adjusted position of the pivoted section and in front thereof in the other adjusted position of the pivoted section, and said partitions having their adjacent edges so shaped relatively one to the other as to maintain substantially the same spacing therebetween irrespective of the position of the pivoted section.

12. In a typographical composing machine, the combination with a pair of superposed inclined matrix magazines, of an assembler entrance including a relatively fixed partitioned section to receive matrices discharged from either magazine and a second pivoted partitioned section adjustable to two different positions to make and break an operative connection between the fixed section and either one of the magazines, the partitions in said sections being in alinement and arranged in overlapping edge to edge relation, such that those in the pivoted section are located above those in the fixed section in one adjusted position of the pivoted section and in front thereof in the other adjusted position of the pivoted section, and said partitions having their adjacent edges, in at least the overlapping portions thereof, shaped substantially concentrically so as to maintain substantially the same spacing therebetween irrespective of the position of the pivoted section.

13. In a typographical composing machine, the combination of two superposed channeled magazines provided with escapements and containing matrices occupying differently located channels according to character, a single set of escapement actuating members, a corresponding set of key-controlled levers for operating said members, two sets of intermediate reeds for transmitting motion from the levers to the actuating members, one set of reeds for each of said magazines, and power means for adjusting the levers into operative relation with one or the other set of reeds, as desired.

14. In a typographical composing machine, the combination of two sets of vertically disposed actuating reeds arranged one behind the other, the lower ends of the reeds of one set being alined at the bottom with corresponding reeds of the other set, a single set of rocking levers for operating the reeds, a series of key-controlled power-actuated rods for rocking the levers, an adjustable frame wherein said levers are pivotally mounted, and power means for adjusting the frame to and fro to locate the levers in operative relation to one or the other set of reeds without disturbing their connection with said power actuated rods.

15. A combination according to claim 13, wherein the power means referred to is key-controlled.

16. A combination according to claim 13, wherein the power means referred to includes mechanism operable through predetermined increments of movement and arranged to adjust the levers to cooperate with one set of reeds during certain alternate increments of movement and with the other magazine during other alternate increments of movement.

17. A combination according to claim 13, wherein the power means referred to includes an element rotatable in the same direction through predetermined increments of movement and arranged to adjust the key levers to cooperate with one set of reeds during certain alternate increments of movement and with the other set of reeds during other alternate increments of movement.

18. A combination according to claim 13, wherein the power means referred to includes a cam rotatable in one direction only, and intermediate connections between the cam and the levers, said cam being formed so that upon rotation it will effect the adjustment of the levers alternately into operative relation with the respective sets of reeds.

19. A combination according to claim 13, wherein the power means referred to includes a cam rotatable in one direction only, intermediate connections between the cam and levers, and means including a ratchet device for rotating the cam through equal increments of movement, said cam being formed so that upon certain alternate increments of movement it will adjust the levers into operative relation with one set of reeds and during other alternate increments of movement with the other set of reeds.

20. A combination according to claim 13, wherein the power means referred to includes a cam rotatable in one direction only, intermediate connections between the cam and levers, said cam being formed so that upon certain alternate increments of movement it will adjust the levers into operative relation with one set of reeds and during other alternate increments of movement with the other set of reeds, and means for preventing overrunning of the cam.

21. A combination according to claim 13, wherein the power means referred to includes a cam rotatable in one direction only, intermediate connections between the cam and levers, said cam being formed so that upon certain alternate increments of movement it will adjust the levers into operative relation with one set of reeds and during other alternate increments of movement with the other set of reeds, means for preventing overrunning of the cam, and means for preventing retrograde movement of the cam.

22. A combination according to claim 13, wherein the power means referred to includes a cam rotatable in one direction only, intermediate connections between the cam and levers, said cam being formed so that upon certain alternate increments of movement it will adjust the levers into operative relation with one set of reeds and during other alternate increments of movement with the other set of reeds, means including a pawl adapted when operated to prevent advance movement of the cam, and key means for rendering the pawl inoperative.

23. A combination according to claim 13, wherein the power means referred to includes a cam rotatable in one direction only, intermediate connections between the cam and levers, said cam being formed so that upon certain alternate increments of movement it will adjust the levers into operative relation with one set of reeds and during other alternate increments of movement with the other set of reeds, means including a pawl adapted when operated to prevent advance movement of the cam, and key means for controlling the movement of the cam and for rendering the pawl inoperative.

24. In a typographical composing machine, the combination with a pair of superposed channeled magazines provided each with a set of escapements and containing matrices occupying differently located channels according to character, of an assembler entrance including a relatively fixed section to receive matrices discharged from either magazine and a pivoted section adjustable to two different positions to make and break an operative connection between the fixed section and either one of the magazines, a single set of escapement actuating members, a corresponding set of key-controlled levers for actuating said members, two sets of intermediate reeds for transmitting motion from the levers to the actuating members, one set of reeds for each of said magazines, and means acting when the pivoted section is adjusted to effect an operative connection with one magazine concurrently to effect an operative connection between the actuating levers and the corresponding set of reeds.

25. In a typographical composing machine, the combination with a pair of superposed channeled magazines provided each with a set of escapements and containing matrices occupying differently located channels according to character, of an assembler entrance including a relatively fixed section to receive matrices discharged from either magazine and a pivoted section adjustable to two different positions to make and break an operative connection between the fixed section and either one of the magazines, a single set of escapement actuating members, a corresponding set of key-controlled levers for actuating said members, two sets of intermediate reeds for transmitting motion from the levers to the actuating members, one set of reeds for each of said magazines, and means acting when the pivoted section is adjusted to effect an operative connection with either magazine concurrently to effect an operative connection between the actuating levers and the corresponding set of reeds.

26. A combination according to claim 24, wherein the pivoted section is adjusted and the operative connection between the actuating levers and reeds effected by mechanism having parts in common.

27. A combination according to claim 24, wherein the pivoted section is adjusted and the operative connection between the actuating levers and reeds effected by common power operated mechanism.

28. A combination according to claim 24, wherein the pivoted section is adjusted and the operative connection between the actuating levers and reeds effected by common key-controlled power operated mechanism.

29. In a typographical composing machine, the combination with a pair of superposed inclined matrix magazines having differently spaced matrix channels, of an assembler entrance including a fixed partitioned section having its partitions spaced apart in accordance with the spacing of the matrix channels of one magazine, a second fixed partition section having its partitions spaced apart in accordance with the spacing of the matrix channels of the other magazine, a pivoted partitioned section adjustable into operative relation to one or another of the two fixed sections and having its partitions arranged to register with the partitions of either fixed section, and a third fixed partitioned section arranged in constant operative relation to the pivoted section and having its partitions arranged in constant registration with the partitions of said pivoted section.

30. In a typographical composing machine, the combination with two superposed magazines, each provided with escapements and containing matrices occupying different channels according to character, of an assembler entrance including a relatively fixed section adapted to receive matrices from either magazine, and a pivoted section adjustable to make and break an operative connection between said fixed section and either magazine, a keyboard, adjustable means whereby the keyboard may be connected to the escapements of one or the other of the magazines notwithstanding the different location of their matrix channels, and mechanism whereby the adjustment of the keyboard connections is effected automatically in accordance with the adjustment of the pivoted assembled entrance section.

31. In a typographical composing machine, the combination with two superposed magazines, each provided with escapements and containing matrices occupying different channels according to character, of an assembler entrance including a relatively fixed section adapted to receive matrices from either magazine, and a pivoted section adjustable to make and break an operative connection between said fixed section and either magazine, a keyboard, adjustable means whereby the keyboard may be connected to the escapements of one or the other of the magazines notwithstanding the different location of their matrix channels, and a common power operated mechanism for effecting the adjustment of both the keyboard connections and the pivoted assembler entrance section.

32. In a typographical composing machine, the combination of two superposed magazines, each provided with escapements and containing matrices occupying different channels according to character, of an assembler entrance including a relatively fixed section adapted to receive matrices from either magazine, and a pivoted section adjustable to make and break an operative connection between said fixed section and either magazine, a keyboard, adjustable means whereby the keyboard may be connected to the escapements of one or the other of the magazines notwithstanding the different location of their matrix channels, and a key controlled power operated mechanism for effecting the adjustment of both the keyboard connections and the pivoted assembler entrance section.

FRANK C. FROLANDER.
HAROLD A. BURT.